United States Patent
Tuttle, deceased et al.

[15] 3,688,666
[45] Sept. 5, 1972

[54] UNDERWATER RECONNAISSANCE SYSTEM

[72] Inventors: Fordyce E. Tuttle, deceased, late of Palm Beach, Fla.; by Eleanor Porter Tuttle, executrix, 1017 N. Lake Way, Palm Beach, Fla. 33480

[22] Filed: Feb. 20, 1970

[21] Appl. No.: 13,262

[52] U.S. Cl. ..................................95/12.5, 95/11 W
[51] Int. Cl. ................................................G03b 29/00
[58] Field of Search............95/11 UW, 11 HC, 12.5

[56] References Cited

UNITED STATES PATENTS

| | | | |
|---|---|---|---|
| 3,019,292 | 1/1962 | John | 95/12.5 X |
| 3,076,189 | 1/1963 | Goddard | 95/12.5 X |
| 2,341,745 | 2/1944 | Silverman et al. | 95/11 HC |
| 404,390 | 6/1889 | Dutton | 95/11 W |

FOREIGN PATENTS OR APPLICATIONS 1,131,535   10/1968   Great Britain..............95/12.5

Primary Examiner—John M. Horan
Assistant Examiner—Kenneth C. Hutchison
Attorney—Eugene F. Malin

[57] ABSTRACT

An underwater reconnaissance system having a high intensity scanning light source and an image motion compensated camera, both mounted on a single mobile platform. The camera and the light source are so positioned with respect to each other optically on the platform and the body of water to be photographed that the camera will receive very little specular light reflections from the water surface if photographed from the air and very little back scatter from underwater illumination if photographed from a submerged platform.

4 Claims, 3 Drawing Figures

INVENTOR
FORDYCE E. TUTTLE, deceased
by ELEANOR PORTER TUTTLE

BY

ATTORNEY

UNDERWATER RECONNAISSANCE SYSTEM

BACKGROUND OF THE INVENTION

Underwater reconnaissance in recent years has assumed increasing importance, but the results achieved from employing underwater and/or airborne underwater photographic systems have been disappointing because of factors such as reflections from the water's surface or back scatter encountered underwater. Applicant's invention relates to a system and method of underwater reconnaissance that eliminates and prevents reflections of the water from interfering with the optical reception from an illuminated underwater object.

BRIEF DESCRIPTION OF THE INVENTION

A method and apparatus for underwater reconnaissance from a mobile platform comprising photographic means fixed at a first position on said platform, a narrow-beam high intensity illuminating means fixed at a second position on said platform, said photographic means optically directed in an angular relationship with respect to said illuminating means to reduce back scatter and specular surface reflections while photographing an underwater segment of a body of water. The illuminating source may consist of a flying spot scanning device or any high intensity narrow-beam type illumination source. The photographic means has an aperture image slit that is offset from the lens optical axis at a angle such that the narrow object field of the slit intersects the illuminating beam at the desired operative depth and does not include specularly reflected light from the water's surface, while the photographic film is image motion compensated to correct for the motion of the mobile platform over or through the water's body that is being reconnoitered.

It is an object of this invention to provide an underwater reconnaissance system having improved detection capability.

It is another object of this invention to provide an airborne underwater reconnaissance system in which surface and below surface water reflections are effectively reduced to improve detection capability.

And yet another object of this invention is to provide an underwater surveillance system in which the water back scatter is reduced for improved detection capability.

In accordance with these and other objects which will be apparent hereinafter, the instant invention will now be described with particular reference to the accompanying drawing.

PREFERRED EMBODIMENT OF THE INVENTION

Figure 1:
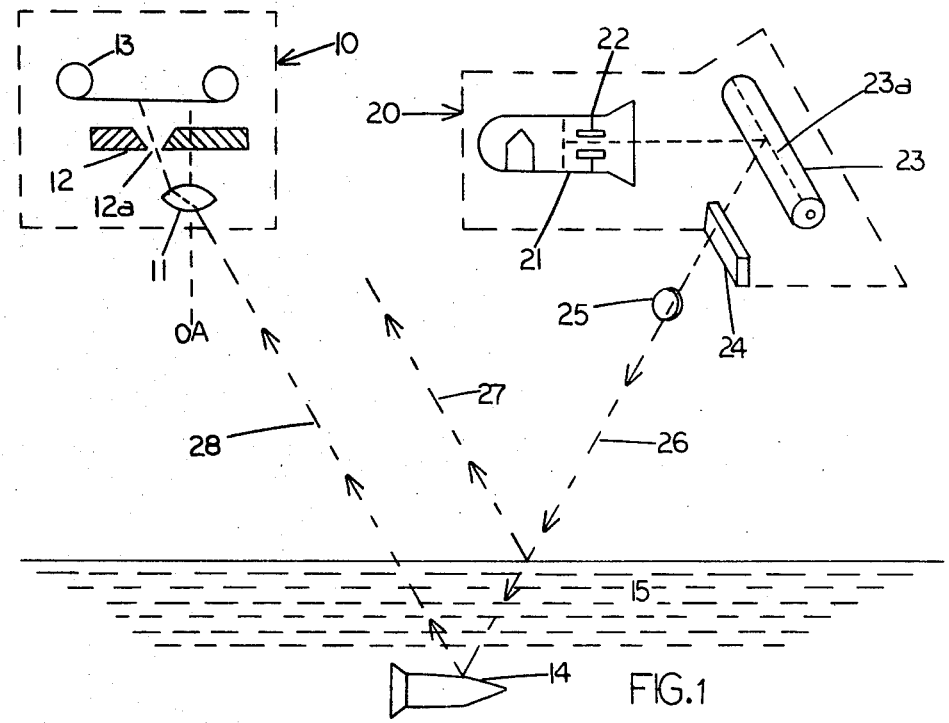
FIG. 1 shows a schematic diagram of the system elements employed by applicant.

Referring now to the drawing and in particular FIG. 1, a preferred embodiment of applicant's invention is shown. The basic system is comprised of a photographic device 10 and an illuminating device 20, the illuminating device and the photographic device being mounted upon the platform to be used for reconnaissance and being spaced apart a sufficient distance to allow for an angular displacement of a specific high intensity, narrow light beam generated by the illuminating means and used to illuminate objects underwater, such as shown at 14, and the surface reflection that it generates. For a maximum angular reflection separation, the photographic device and the illuminating device are placed as far apart as possible on the mobile reconnaissance platform. Photographic device 10 is shown as having a lens 11 with optic axis OA. Positioned in the focal plane of the lens 11 is a plate 12 having a slit 12a that is angularly spaced from the optic axis of the lens 11 and allows only light of a certain angular relationship to OA, to pass through the lens 11, and reach a film 13. Film 13 is image motion compensated by a device not shown) so as to adjust for the speed of the moving mounting platform over the earth's surface.

The illuminating device 20 is comprised of a flying spot scanner having a CRT with a deflection plate 22 having a sweep rate of 5,000 cps, and rotating phosphor coated heat sink-drum 23. The generated light is directed through tube window 24 and a projection lens 25. The particular mounting platform for the photographic device 10 and illuminating source 20 is not shown in FIG. 1 for the sake of clarity.

In operation, the illuminating source 20 generates a pencil-like, narrow beam of light 26 that sweeps an ocean or body of water 15 transversely to the path of the reconnaissance platform. When a wave front in light beam 26 reaches the surface of the body of water 15, a portion will be reflected as a specular reflection 27, the remainder being transmitted into the body of water, reaching an object such as 14 and reflecting from the object 14 and again passing out of the body of water up to and reaching the lens 11 which images it through slit 12a on the film 13. Because of the reflected light beam displacement created by the positioning and directing of the illuminating source relative to photographic device 10, specular light beam 27 is reflected from a smooth surface at such an angle that it cannot enter the photographic device. No specular reflection from smooth water enters the camera slit and very little back scatter from rough water enters the slit.

In the above example, the rotating phosphor coated heat sink-drum 23 is 6 inches long and is scanned 5,000 times per second by the electron beam. With a 1-foot focal length of projection lens 25, each sweep illuminates, from 5,000 feet altitude, a transverse strip of water about 5 inches wide and 1,200 feet long. Thus with an aircraft flying at 280 miles per hour, about 70 square miles of ocean are covered per hour, and at 560 miles per hour with three units or systems of FIG. 1 side by side, 420 square miles of water surface are covered per hour. It is noted also that with a projection lens 25 having a 6-inch focal length, the path width becomes equal to the plane's altitude, say 1 mile, and the coverage per hour is four times greater than with a 1-foot focal length lens.

Figure 2:
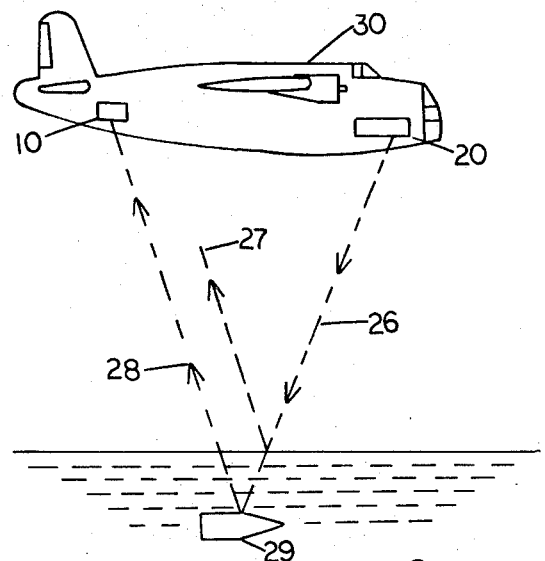
FIG. 2 shows a schematic diagram of applicant's device in an aircraft.

FIG. 2 shows the system employed in an aircraft 30, with the photographic device in the tail section and the illuminating means 20 positioned near the nose of the aircraft. The particular light wave reflection pattern, as shown in FIG. 1, is displayed illuminating an underwater object 29.

Figure 3:
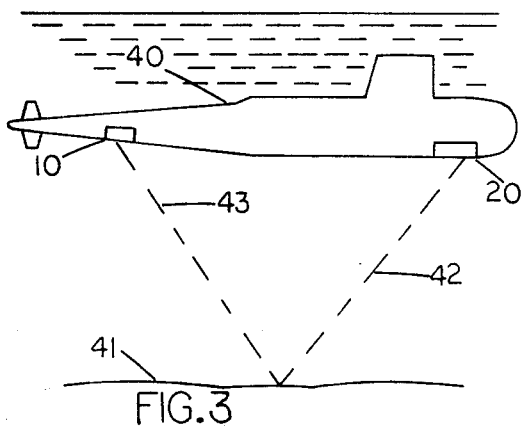
FIG. 3 shows a schematic diagram of a submarine engaged in underwater photography according to applicant's invention.

FIG. 3 shows the system employed on an underwater photographic mission in which a submarine 40 has a camera or photographic device 10 placed near the stern of the submarine and illuminating device 20 is placed near the bow. A flying spot scanning ray or beam 42 is generated that reflects off the bottom of the ocean floor 41 and is received as light beam 43 in the photographic device 10. In this modification, back scatter produced by the water around the illuminating source is not received directly into the photographic device.

In applicant's invention, it is noted that the system eliminates back scatter emanating from the water and water's surface not by merely defocusing it but rather by displacing it out of the field of view of the camera. The camera and/or the illuminating device positions and the height and/or depth of the mobile platform can be varied to either maintain or change the point of intersection of the light ray underwater to vary the photographed depth.

In FIG. 3, for underwater photography, again the submarine can illuminate objects with a high intensity narrow-beam flying spot scanner. The beam is scanned in one direction only, perpendicular to the submarine course, with vehicle motion providing the scan in the other direction. Again, the camera is comprised of a lens imaging onto a narrow offset slit, behind which the film is moved in scaled sequence with the vehicle velocity. In addition, narrow band green light would help to reduce back scatter as does the maximum physical separation of the illuminating scanner and the photographic device. If the scanner is a rotating mirror type currently used in the laser scanners, it would be possible to use the rotating mirror to scan the image in synchronism with the spot thereby reducing the back scatter effect.

Other uses for applicant's invention include underwater inspection of damage to a hull or other enclosed portion of a sunken ship because it provides a record of the damage that can be studied at leisure by experts rather than interpreting reports made by a diver after a visual inspection which may have been made under unfavorable conditions. The device may also be used for locating fish, sunken wreck, or for shallow water nagivation. The camera may be replaced with a television type of receiver which will cover a greater volume of water per unit time and provide a much greater detail of the area under surveillance.

Refraction of light at the air-water interface has, for convenience in describing the invention, been ignored since those skilled in the art can readily take this item into account in practicing the invention.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A radiation reflecting system for detecting objects beneath the surface of a body of water comprising:
   an electro-magnetic radiation means including,
   an electro-magnetic radiation source, and
   an adjustable radiation directing means for directing the electro-magnetic radiation energy from said source toward the body of water at a first angle,
   a detecting means separated from said electro-magnetic radiation means and including, an electro-magnetic radiation detector, an adjustable reflection limiting means positioned adjacent said detector and positionable in relation to said first angle of electro-magnetic radiation energy from said electro-magnetic radiation means, and the height of said electro-magnetic radiation means and said reflection limiting means above the body of water to eliminate surface reflections by displacement to detect reflections from an object at a particular depth below the surface of the body of water.

2. A light reflecting system for detecting objects beneath the surface of a body of water as set forth in claim 1, wherein,
   said electro-magnetic radiation means is a light means,
   said source is a light source,
   said detector is a light detector.

3. A light reflecting system for detecting objects beneath the surface of a body of water as set forth in claim 2 wherein,
   said light means and said detecting means are connected to an airplane for movement over a large body of water to detect submarines.

4. A light reflecting system for detecting objects beneath the surface of a body of water as set forth in claim 2 wherein,
   said light means produces a narrow high intensity light source.

* * * * *